United States Patent [19]

Okazaki et al.

[11] Patent Number: 5,187,714
[45] Date of Patent: Feb. 16, 1993

[54] LASER-DIODE-PUMPED SOLID-STATE LASER

[75] Inventors: Yoji Okazaki; Hiroaki Hyuga, both of Kanagawa, Japan

[73] Assignee: Fuji Photo Film Co., Ltd., Kanagawa, Japan

[21] Appl. No.: 779,277

[22] Filed: Oct. 18, 1991

[30] Foreign Application Priority Data

Oct. 19, 1990 [JP] Japan .................. 2-109818[U]
Dec. 6, 1990 [JP] Japan .................. 2-400624

[51] Int. Cl.⁵ .................. H01S 3/04; H01S 3/10; H01L 23/02
[52] U.S. Cl. .................. 372/36; 372/34; 372/22; 372/70; 372/92; 359/326; 257/930
[58] Field of Search .................. 372/21, 22, 29, 34, 372/35, 36, 43, 50, 75, 69, 80, 70, 92; 357/80, 81, 87, 17; 359/326, 328, 329

[56] References Cited

U.S. PATENT DOCUMENTS

| | | | |
|---|---|---|---|
| 4,756,003 | 7/1988 | Baer et al. | 372/75 |
| 4,761,786 | 8/1988 | Baer | 372/10 |
| 4,847,850 | 7/1989 | Kafka et al. | 372/71 |
| 4,847,851 | 7/1989 | Dixon | 372/75 |
| 4,860,304 | 8/1989 | Mooradian | 372/75 |
| 4,872,177 | 10/1989 | Baer et al. | 372/75 |
| 4,884,277 | 11/1989 | Anthon et al. | 372/22 |
| 5,068,865 | 11/1991 | Ohshima et al. | 372/36 |
| 5,124,999 | 6/1992 | Okazaki et al. | 372/69 |

FOREIGN PATENT DOCUMENTS 62-189783 8/1987 Japan .................. 372/75 X
62-210432 9/1987 Japan .................. 372/109 X

OTHER PUBLICATIONS

Lin et al., "Solution Growth of New Organic Nonlinear Optical Crystal Material", SPIE, vol. 1104, pp. 100 and 132, Mar. 1989.
Amano et al., "Diode Pumped NYAB Green Laser", Laser Research, vol. 17, No. 12, p. 48, Dec. 1989.

Primary Examiner—Brian Healy
Attorney, Agent, or Firm—Sughrue, Mion, Zinn, Macpeak & Seas

[57] ABSTRACT

A laser-diode-pumped solid-state laser includes a solid-state laser rod pumped by a pumping laser beam emitted from a semiconductor laser. The laser beam produced by the solid-state laser rod is oscillated by a resonator, and the wavelength of the oscillated laser beam is converted into another wavelength by an optical wavelength converter. The resonator is jointly provided by the solid-state laser rod and the optical wavelength converter. Alternatively, the solid-state laser rod may comprise a self-frequency-doubling crystal for producing a laser beam, oscillating the laser beam, and converting the wavelength of the oscillated laser beam into another wavelength. The temperature of the semiconductor laser and the resonator is regulated by a common temperature regulating device which comprises a Peltier device controlled by a driver circuit. Since the semiconductor laser and the resonator are regulated in temperature by the common temperature regulating device, no thermal interaction occurs between the semiconductor laser and the resonator.

10 Claims, 3 Drawing Sheets

LASER-DIODE-PUMPED SOLID-STATE LASER

BACKGROUND OF THE INVENTION

1. Field of the Invention

The present invention relates to a laser-diode-pumped solid-state laser having a solid-state laser rod that is pumped by a semiconductor laser in the form of a laser diode, and more particularly to a laser-diode-pumped solid-state laser having a wavelength conversion capability.

2. Description of the Prior Art

Japanese Unexamined Patent Publication No. 62(1987)-189783, for example, discloses a laser-diode-pumped solid-state laser having a solid-state laser rod doped with a rare-earth element such as neodymium (Nd), the solid-state laser rod being pumped by a semiconductor laser.

According to one conventional design involving such a laser-diode-pumped solid-state laser, the resonator houses a bulk single crystal of a nonlinear optical material for converting the wave of a solid-laser-oscillated beam into a second harmonic thereby to produce a laser beam of a shorter wavelength, as disclosed in U.S. patent application Ser. No. 406,018, now U.S. Pat. No. 5,124,999 for example. Another proposal, discussed in Applied Physics Letter, Vol. 52, No. 2, 11 Jan. 1988, also employs a bulk single crystal of a nonlinear optical material disposed in a resonator, for converting a solid-laser-oscillated beam and a pumping laser beam into a laser beam having a frequency that is equal to the sum of the frequencies of the solid-laser-oscillated beam and the pumping laser beam.

SPIE, Vol. 1104, p. 100, March 1989, shows a known solid-state laser rod of Nd:COANP, Nd:PNP, or the like that is doped with a rare-earth element such as neodymium and has a wavelength conversion capability. Another known solid-state laser rod disclosed in the same journal, p. 132 is made of Nd:LiNbO$_3$, NYAB(ND$_x$Y$_{1-x}$Al$_3$(BO$_3$)$_4$) (x=0.04~0.08). These materials are referred to as a self-frequency-doubling crystal.

There is known a laser-diode-pumped solid-state laser that employs a NYAB crystal and produces a second harmonic of a laser beam oscillated by laser-diode pumping, as disclosed in SPIE, Vol. 1104, p. 100, March 1989 and Laser Research, Vol. 17, No. 12, p. 48, 1989.

In the known laser-diode-pumped solid-state laser, the temperature of the semiconductor laser is controlled with an accuracy of ±0.1° C. to equalize the wavelength of the laser beam emitted by the semiconductor laser to the wavelength of the laser beam absorbed by the solid-state laser rod for laser output power stabilization.

It has also been proposed in U.S. Pat. No. 4,884,277 to regulate the temperature of a resonator with an accuracy of ±0.1° C. when the laser beam emitted by a laser-diode-pumped solid-state laser is converted into a wavelength-converted wave by two waveform converters, for stabilizing the output power level of the wavelength-converted wave and reducing the noise of the wavelength-converted wave.

However, the conventional laser-diode-pumped solid-state laser has been disadvantageous in that the temperature of the resonator cannot sufficiently be regulated, resulting in output power variations due to temperature-dependent changes in the resonator length, temporary output interruptions owing to mode hopping, and noise in the wavelength-converted wave. These problems are especially conspicuous when the ambient temperature is changed, for example, from 20° C. to 40° C.

SUMMARY OF THE INVENTION

In view of the aforesaid drawbacks of the conventional laser-diode-pumped solid-state laser, the object of the present invention is to provide a laser-diode-pumped solid-state laser which stably operates to produce a laser beam of short wavelength without output power variations, temporary output interruptions, and other conventional shortcomings.

Another object of the present invention is to provide a laser-diode-pumped solid-state laser which is highly stable in output power level, may be reduced in size and weight, and can be manufactured at a low cost.

According to the present invention, a laser-diode-pumped solid-state laser includes a solid-state laser rod doped with a rare-earth element such as neodymium, the solid-state laser rod being pumped to produce a laser beam by a pumping laser beam emitted from a semiconductor laser. The laser beam produced by the solid-state laser rod is oscillated by a resonator, and the wavelength of the oscillated laser beam is converted into another wavelength by an optical wavelength converter. The resonator is jointly provided by the solid-state laser rod and the optical wavelength converter. Alternatively, the solid-state laser rod may comprise a self-frequency-doubling crystal for producing a laser beam, oscillating the laser beam, and converting the wavelength of the oscillated laser beam into another wavelength. The temperature of the semiconductor laser and the resonator is regulated by a common temperature regulating means which comprises a Peltier device controlled by a driver circuit.

Heretofore, when temperature of the semiconductor laser and the resonator is regulated, the output level of the solid-state laser may slightly fluctuates. It has been found by the inventors that such output level fluctuations are brought about by temperature changes of the semiconductor laser and the resonator due to a thermal interaction therebetween.

With the arrangement of the present invention, since the semiconductor laser and the resonator are regulated in temperature by the common temperature regulating means, no thermal interaction occurs between the semiconductor laser and the resonator.

The temperature of the semiconductor laser and the resonator can be regulated with an accuracy of ±0.01° C. Therefore, the length of the resonator can be kept constant highly accurately to suppress noise of the wavelength-converted wave for high output level stability.

Since the common temperature regulating means is shared by the semiconductor laser and the resonator, the laser-diode-pumped solid-state laser can be reduced in size and weight, and can be manufactured at a low cost.

In the present invention, in order to improve the accuracy of the temperature regulation, it is preferred that a plurality of Peltier devices constituting the common temperature regulating means are provided in such a way that they surround the semiconductor laser and the resonator. For example, with a structure in which the semiconductor laser and the resonator are interposed between the two Peltier devices constituting the common temperature regulating means, the accuracy of the temperature regulation is further improved and can be as high as in the range of ±0.001° C. even when the environmental temperature varies abruptly.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
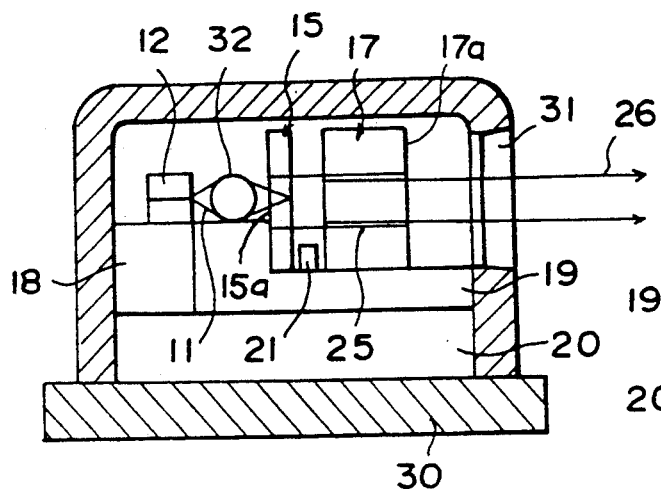
FIG. 1 is a side elevational view, partly in cross section, of a laser-diode-pumped solid-state laser according to a first embodiment of the present invention.

Like or corresponding parts are denoted by like or corresponding reference characters throughout views.

FIG. 1 shows a laser-diode-pumped solid-state laser according to a first embodiment of the present invention. The laser-diode-pumped solid state laser comprises a semiconductor laser (phased-array laser) 12 for emitting a pumping laser beam 11, a ball lens 32 for converging the laser beam 11 which is a divergent laser beam, a solid-state laser rod 15 doped with neodymium, which is in the form of an Nd:YVO$_4$ rod, and an optical wavelength converter 17 positioned in front of the Nd:YVO$_4$ rod, i.e., rightwardly of the Nd:YVO$_4$ as shown. The optical wavelength converter 17 may be made of a KTP crystal, for example. The optical wavelength converter 17 has a righthand end surface 17a serving as a mirror of a resonator of the solid-state laser, as described later on.

The semiconductor laser 12 is mounted on a heat sink 18 for heat radiation. The Nd:YVO$_4$ rod 15, which provides one resonator mirror, and the optical wavelength converter 17 are mounted on a heat sink 19. The heat sinks 18, 19 are fixedly mounted on a Peltier device 20. The Peltier device 20 is controlled in its operation by a driver circuit (not shown in FIG. 1) which is supplied with a temperature signal from a temperature sensor 21 that detects the temperature in the resonator. The above components of the laser-diode-pumped solid-state laser are housed in an LD package 30 which has a filter 31 for selectively passing only a second harmonic. The laser-diode-pumped solid-state laser of the above arrangement can be reduced in size and weight.

The pumping laser beam 11 emitted by the phased-array laser 12 has a wavelength λ1 of 809 nm, and is applied through the ball lens 32 to the Nd:YVO$_4$ rod 15. When the neodymium atoms of the Nd:YVO$_4$ rod 15 are excited by the laser beam 11, the Nd:YVO$_4$ rod 15 emits a laser beam 25 having a wavelength λ2 of 1064 nm.

The Nd:YVO$_4$ rod 15 has a surface 15a on which the laser beam 11 falls. The surface 15a is coated with a coating layer for well reflecting the laser beam 25 with a reflectivity of 99.9% or higher and for well passing the pumping laser beam 11 therethrough with a transmittance of 99% or higher. The end surface 17a of the optical wavelength converter 17 is flat and coated with a coating layer for well reflecting the laser beam 25 and for well passing a second harmonic 26 having a wavelength λ3 of 532 nm therethrough. The surfaces 15a, 17a serve as respective mirrors which define a resonator therebetween.

Therefore, the laser beam 25 is confined between the end surfaces 15a, 17a, i.e., in the resonator, causing laser oscillation. The laser beam 25, upon entering the optical wavelength converter 17, is converted into the second harmonic 26.

The optical wavelength converter 17 has a lefthand surface coated with a coating for well passing both the laser beam 25 and the second harmonic 26 therethrough.

The Peltier device 20 is driven by the driver circuit in order to keep the temperature, as detected by the temperature sensor 21, of the semiconductor laser 12 and the resonator at a constant level. Since the semiconductor laser 12 and the resonator are thus regulated in temperature, any thermal interaction thereof is suppressed thereby preventing the length of the resonator from varying due to temperature changes. The Peltier device 20 is effective to control the semiconductor laser 12 and the resonator with an accuracy of ±0.01° C., so that the length of the resonator can be kept constant highly accurately.

Inasmuch as the optical wavelength converter 17 is made of a KTP crystal, which is of TYPE II, any changes in the phase difference δ due to temperature changes of the crystal are held to minimum. As a consequence, variations in the direction of the polarization of the oscillated laser beam are also suppressed, resulting in a reduction in the output power fluctuations of the second harmonic 26.

The Nd:YVO$_4$ rod 15 may be replaced with a solid-state laser rod made of a material that can absorb the pumping laser beam highly efficiently, e.g., Nd$_x$Y$_{1-x}$Al$_3$(BO$_3$)$_4$(x=0.06~0.12%), NAB, LNP, NPP, or the like.

The material of the optical wavelength converter 17 is not limited to the KTP crystal, but may be KNbO$_3$ or PRA {3,5-dimethyl-1-(4-nitrophenyl)pyrazole} disclosed in Japanese Unexamined Patent Publication No. 62(1987)-210432.

The semiconductor laser 12 may comprise a broad area laser, a single longitudinal or transverse mode laser, or the like, instead of the phased-array laser.

It is preferable that the resonator have a length of 10 mm or less.

The ball lens 32 may be dispensed with, and the solid-state laser rod 15 may be held in close contact with a tip of the semiconductor laser 12.

Figure 2:
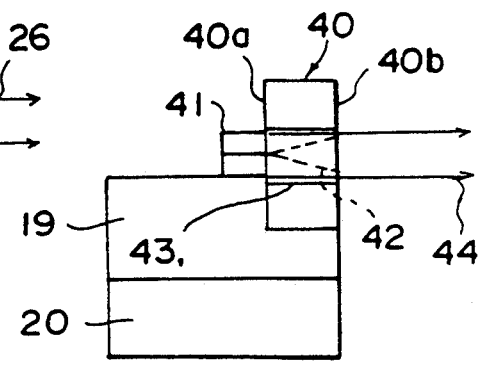
FIG. 2 is a side elevational view of a laser-diode-pumped solid-state laser according to a second embodiment of the present invention.

FIG. 2 shows a laser-diode-pumped solid-state laser according to a second embodiment of the present invention. In the second embodiment, the laser-diode-pumped solid-state laser includes a solid-state laser rod 40 of NYAB which is a self-frequency-doubling crystal, described above. A semiconductor laser 41 is fixed in intimate contact with an end surface of the NYAB rod 40. The NYAB rod 40 and the semiconductor laser 41 are fixedly mounted on a heat sink 19 which is in turn fixedly mounted on a Peltier device 20.

The semiconductor laser 41 emits a pumping laser beam 42 having a wavelength $\lambda 1$ of 804 nm. When the neodymium atoms of the NYAB rod 40 are excited by the laser beam 42 applied thereto, the NYAB rod 40 emits a laser beam 43 having a wavelength $\lambda 2$ of 1062 nm.

The laser-diode-pumped solid-state laser has a resonator that is formed solely by the NYAB rod 40, which has a crystal length L of 2 mm. The NYAB rod 40 has an end surface 40a serving as an entrance resonator mirror, the end surface 40a being coated with a coating layer for well reflecting the laser beam 43 with a reflectivity of 99.9% or higher and for well passing the pumping laser beam 42 therethrough with a transmittance of 99% or higher. The NYAB rod 40 also has an end surface 40b serving as an exit resonator mirror, the end surface 40b being coated with a coating layer for well reflecting the laser beam 43 with a reflectivity of 99.9% or higher and for well passing a second harmonic 44 having a wavelength of 531 nm therethrough. Therefore, the laser beam 43 is confined between the end surfaces 40a, 40b, i.e., in the resonator, causing laser oscillation.

The laser beam 43, upon entering the NYAB rod 40 serving as an oscillator medium and having a wavelength conversion capability, is converted into the second harmonic 44 whose wavelength (=531 nm) is half that of the laser beam 43.

The crystal of the NYAB rod 40 is cut such that phase matching of TYPE I is achieved between the wavelengths of 1062 nm and 531 nm. As described above, the coating layer on the end surface 40b allows the second harmonic 44 to be transmitted therethrough efficiently.

The temperature of the NYAB rod 40 and the semiconductor laser 41 is regulated highly accurately by the Peltier device 20. Therefore, the length of the resonator can be kept constant highly accurately.

In the second embodiment, the solid-state laser rod 40 is made of a NYAB crystal as a self-frequency-doubling crystal. However, the solid-state laser rod 40 may be made of any of various other self-frequency-doubling crystals, e.g., Nd:MgO:LiNbO$_3$, Nd:KTP, Nd:PNP, or the like. Since these additional materials may have a larger nonlinear optical constant than the NYAB crystal, they make it possible to produce a wavelength-converted wave more efficiently.

Figure 3:
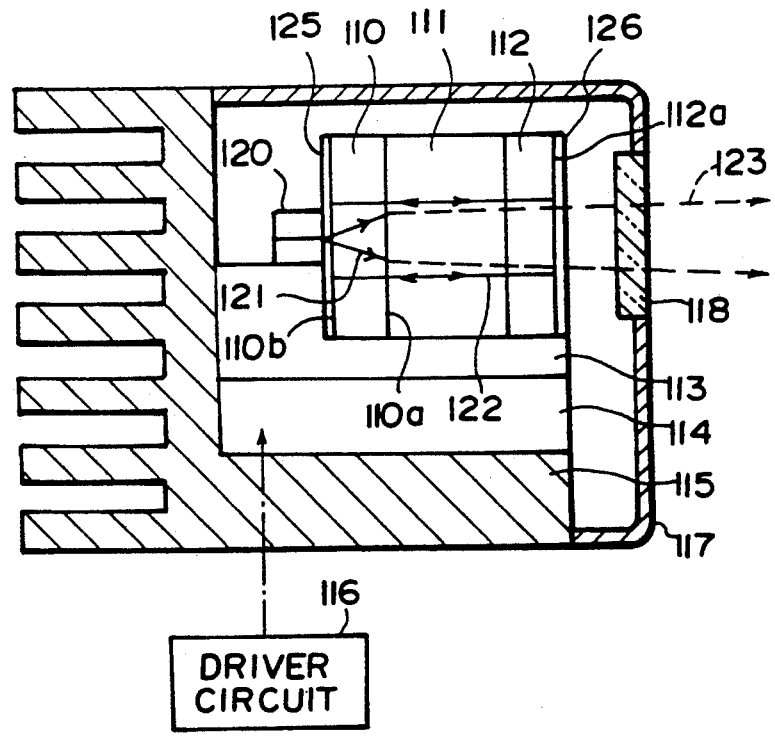
FIG. 3 is a fragmentary side elevational view, partly in cross section and block form, of a laser-diode-pumped solid-state laser according to a third embodiment of the present invention.

FIG. 3 shows a laser-diode-pumped solid-state laser according to a third embodiment of the present invention. The laser-diode-pumped solid-state laser shown in FIG. 3 comprises a YAG rod 110 serving as a solid-state laser medium doped with neodymium, a KNbO$_3$ crystal 111 of a nonlinear optical material held in intimate contact with an end surface 110a of the YAG rod 110, and an etalon 112 held in intimate contact with an end surface of the KNbO$_3$ crystal 111. The YAG rod 110, the KNbO$_3$ crystal 111, and the etalon 112 are fixedly mounted on a heat sink 113 which is in turn fixedly mounted on a TE cooler 114 that may comprise a Peltier device or the like. The TE cooler 114 and the heat sink 113 are fixed intimately to a heat radiator 115.

A semiconductor laser 120 for emitting a pumping laser beam is held closely against the other end surface 110b of the YAG rod 110, and fixedly mounted on the heat sink 113. The semiconductor laser 120 may comprise a phased-array laser, a broad area laser, a single longitudinal or transverse mode layer, or the like.

The YAG rod 110, the KNbO$_3$ crystal 111, the etalon 112, the heat sink 113, the TE cooler 114, and the semiconductor laser 120 are disposed in a space defined by the heat radiator 115 and a cover 117.

The semiconductor laser 120 emits a laser beam 121 having a wavelength of 808 nm. When the doped neodymium atoms of the YAG rod 110 are excited by the laser beam 121 applied thereto, the YAG rod 110 emits a laser beam 122 having a wavelength of 946 nm.

A resonator is formed by and between the YAG rod 110 and the etalon 112. The YAG rod 110 has an end surface 110b serving as an entrance resonator mirror, the end surface 110b being coated with a coating layer 125 for well reflecting the laser beam 122 with a reflectivity of 99.9% or higher and for well passing the pumping laser beam 121 therethrough with a transmittance of 99% or higher. The etalon 112 has an end surface 112a serving as an exit resonator mirror, the end surface 112a being coated with a coating layer 126 for well reflecting the laser beam 122 with a reflectivity of 99.9% or higher and for well passing a second harmonic 123 having a wavelength of 473 nm therethrough.

Therefore, the laser beam 122 is confined between the end surfaces 110b, 112a, i.e., in the resonator, causing laser oscillation.

The laser beam 122, upon entering the KNbO$_3$ crystal 111 having a wavelength conversion capability, is converted into the second harmonic 123 whose wavelength (=473 nm) is half that of the laser beam 122. The KNbO$_3$ crystal 111 is cut such that phase matching is achieved between the wavelengths of 946 nm and 473 nm when the temperature is 30°. Specifically, the KNbO$_3$ crystal 111 in the illustrated embodiment is a B-cut crystal with $\theta=30°$ and $\phi=90°$.

The second harmonic 123 produced by the KNbO$_3$ crystal 111 passes through a filter 118 that is mounted on the cover 117 for cutting off the laser beams 121, 122 whose wavelengths are 808 nm and 946 nm, respectively, and is emitted out of the cover 117. The etalon 112 is effective to transmit the laser beam 122 in a single longitudinal mode.

When the laser-diode-pumped solid-state laser shown in FIG. 3 is energized, the temperature of the pumping semiconductor laser 120 is regulated into a temperature of 30° C. at which the wavelength of the pumping laser beam 121 is equalized to the absorption wavelength of 808 nm of the YAG rod 110, by the TE cooler 114 that is controlled by a driver circuit 116. At this time, temperature of the YAG rod 110 and the etalon 112, which serve as the resonator, is also regulated into 30° C. The phase matching, referred to above, can also be achieved at the temperature of 30° C. by the TE cooler 114. Since the resonator and the semiconductor laser 120 are regulated in temperature by the common TE cooler 114, no thermal interaction occurs between the resonator and the semiconductor laser 120. The resonator and the semiconductor laser 120 can be regulated in temperature with a high accuracy of 30±0.01° C.

In the third embodiment, the highly accurate temperature regulation prevents the length of the resonator from varying due to temperature changes and also prevents the semiconductor laser 120 from mode hopping, resulting in a highly stabilized output level of the laser-diode-pumped solid-state laser. In an experiment carried out on the laser-diode-pumped solid-state laser according to the fourth embodiment, the second harmonic 123 having an output level of 1 mW was produced when the output level of the semiconductor laser 120 was 500 mW, and any output level fluctuations of the second harmonic 123 were about ±1%.

Figure 4:
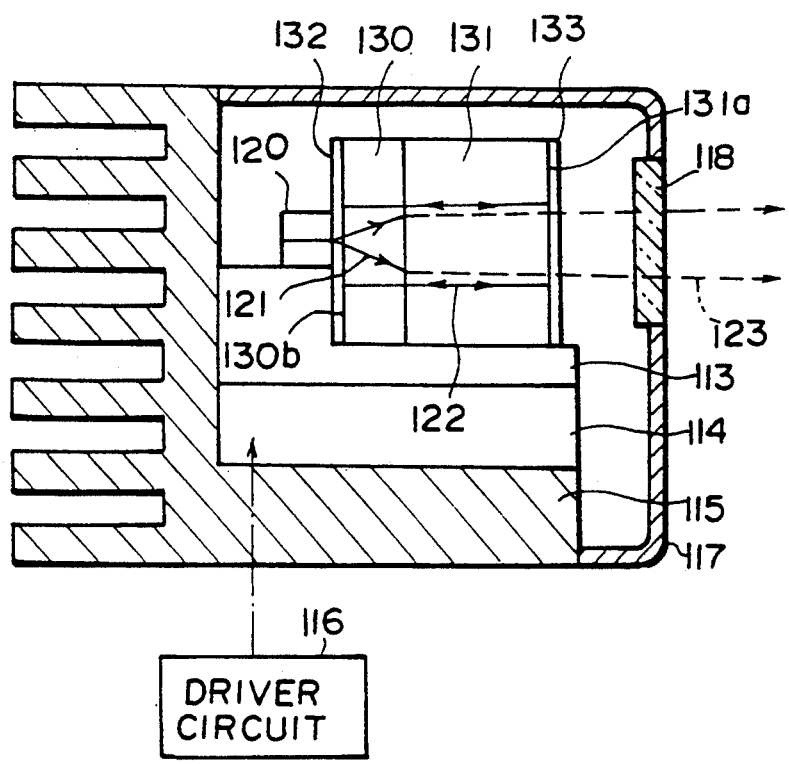
FIG. 4 is a fragmentary side elevational view, partly in cross section and block form, of a laser-diode-pumped solid-state laser according to a fourth embodiment of the present invention.

FIG. 4 shows a laser-diode-pumped solid-state laser according to a fourth embodiment of the present invention. The laser-diode-pumped solid-state laser shown in FIG. 4 differs from that shown in FIG. 3 in that an Nd:YVO$_4$ rod 130 is employed in place of the YAG rod 110 and a KTP crystal 131 of a nonlinear optical material is employed place of the KNbO$_3$ crystal 111 and the etalon 112.

The Nd:YVO$_4$ rod 130 and the KTP crystal 131 are held intimately against each other and serve as a resonator. The Nd:YVO$_4$ rod 130 has an end surface 130b serving as an entrance resonator mirror, the end surface 130b being coated with a coating layer 132 for well reflecting a laser beam 122 having a wavelength of 1064 nm and for well passing a pumping laser beam 121 having a wavelength of 808 nm. The KTP crystal 131 has an end surface 131a serving as an exit resonator mirror, the end surface 131a being coated with a coating layer 133 for well reflecting the laser beam 122 and for well passing a second harmonic 123 having a wavelength of 532 nm therethrough that has been converted from the laser beam 122 by the KTP crystal 131.

When the laser-diode-pumped solid-state laser shown in FIG. 4 is energized, the temperature of the pumping semiconductor laser 120 is regulated into a temperature of 20° C. at which the wavelength of the pumping laser beam 121 is equalized to the absorption wavelength of 808 nm of the Nd:YVO$_4$ rod 130, by the TE cooler 114 that is controlled by the driver circuit 116. At this time, temperature of the Nd:YVO$_4$ rod 130 and the KTP crystal 131, which serve as the resonator, is also regulated into 20° C. by the TE cooler 114. Since the semiconductor laser 120, the Nd:YVO$_4$ rod 130, and the KTP crystal 131 are regulated in temperature by the common TE cooler 114, they can be regulated with a high accuracy of 20±0.01° C.

Also in the fourth embodiment, the highly accurate temperature regulation prevents the length of the resonator from varying due to temperature changes and also prevents the semiconductor laser 120 from mode hopping, resulting in a highly stabilized output level of the laser-diode-pumped solid-state laser. In an experiment carried out on the laser-diode-pumped solid-state laser according to the third embodiment, the second harmonic 123 having an output level of 5 mW was produced when the output level of the semiconductor laser 120 was 200 mW, and any output level fluctuations of the second harmonic 123 were about ±1%.

Figure 5:
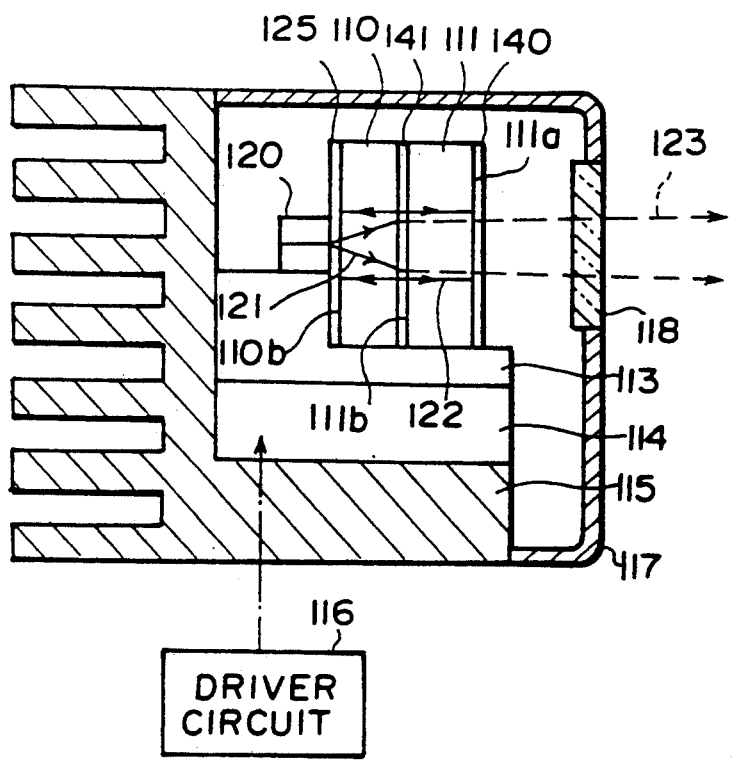
FIG. 5 is a fragmentary side elevational view, partly in cross section and block form, of a laser-diode-pumped solid-state laser according to a fifth embodiment of the present invention.

FIG. 5 shows a laser-diode-pumped solid-state laser according to a fifth embodiment of the present invention. The laser-diode-pumped solid-state laser shown in FIG. 5 differs from that shown in FIG. 3 primarily in that the KNbO$_3$ crystal 111, which is a B-cut crystal, is thinner, and the etalon 112 is dispensed with.

A resonator is formed by and between the YAG rod 110 and the KNbO$_3$ crystal 111. The KNbO$_3$ crystal 111 also serves as a resonator for resonating a second harmonic 123. The YAG rod 110 has an end surface 110b serving as an entrance resonator mirror, the end surface 110b being coated with a coating layer 125 for well reflecting a laser beam 122 having a wavelength of 946 nm and for well passing a pumping laser beam 121 having a wavelength of 808 nm. The KNbO$_3$ crystal 111 has an end surface 111a serving as an exit resonator mirror, the end surface 111a being coated with a coating layer 140 for well reflecting the laser beam 122 and for partially passing the second harmonic 123, which has a wavelength of 473 nm, therethrough with a reflectivity of 98%. The other end 111b of the KNbO$_3$ crystal 111 is coated with a coating layer 141 for well passing the laser beam 122 and well reflecting the second harmonic 123. Therefore, the laser beam 122 resonates between the end surfaces 110b, 111a, and at the same time the second harmonic 123 resonates between the end surfaces 111a, 111b.

The temperature of the resonator and the semiconductor laser 120 is regulated with an accuracy of ±0.01° C. based on the conditions imposed on the resonator. An experiment conducted on the laser-diode-pumped solid-state laser shown in FIG. 5 indicated that the second harmonic 123 having an output level of 10 mW was produced when the output level of the semiconductor laser 120 was 500 mW, and any output level fluctuations of the second harmonic 123 were about ±1%.

Figure 6:
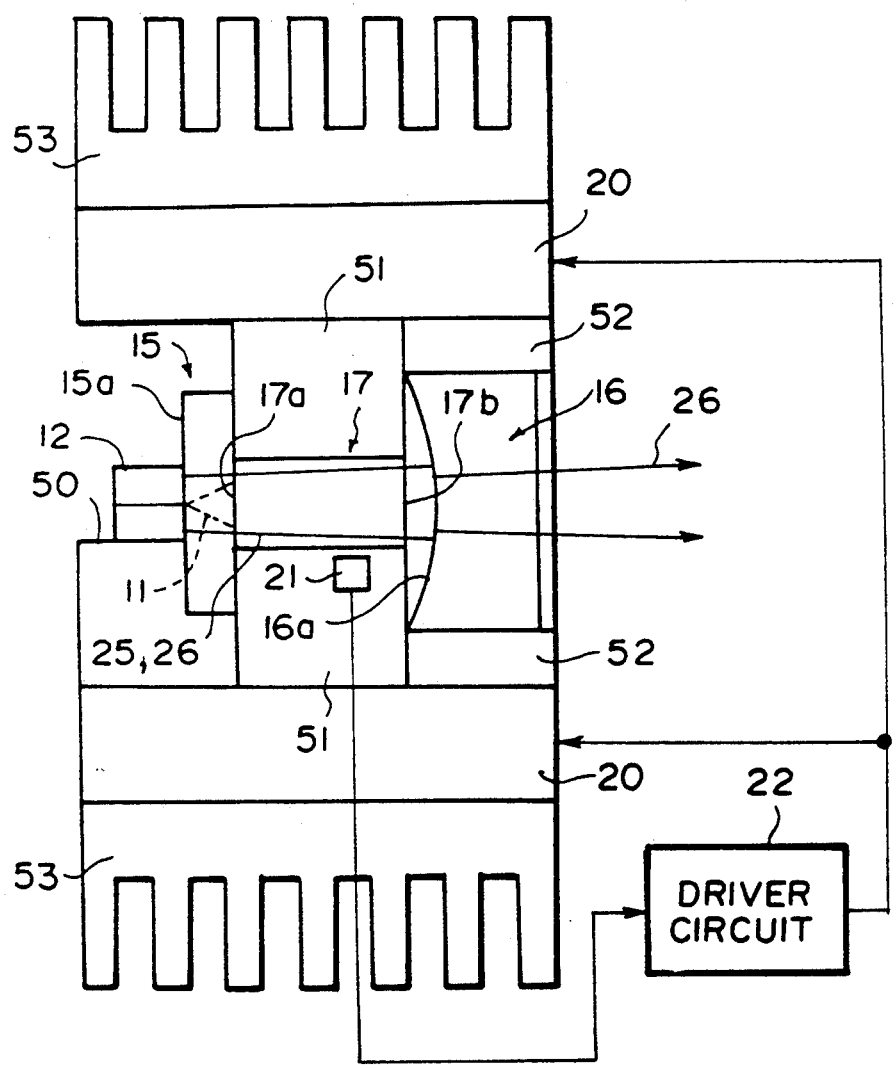
FIG. 6 is a schematic side elevational view of a laser-diode-pumped solid-state laser according to a sixth embodiment of the present invention.

In order to suppress drifts of the wavelength-converted wave even when the ambient temperature abruptly varies, it is necessary to increase the temperature controllability of the resonator so that the laser-diode-pumped solid-state laser will be less susceptible to the ambient temperature. FIG. 6 shows a laser-diode-pumped solid-state laser according to a sixth embodiment of the present invention, which is designed for the increased temperature controllability of the resonator.

According to the sixth embodiment, the laser-diode-pumped solid-state laser includes a semiconductor laser 12, a solid-state laser rod 15 in the form of an Nd:YVO$_4$, an optical wavelength converter 17 of a KTP crystal, which are identical to those shown in FIG. 1, and a resonator mirror 16. The semiconductor laser 12 is fixedly mounted on a mount 50. The Nd:YVO$_4$ rod 15 is bonded to end surfaces of a pair of upper and lower mounts 51. The optical wavelength converter 17 is securely sandwiched between the upper and lower mounts 51. The resonator mirror 16 is also securely sandwiched between upper and lower mounts 52. The mount 50, the lower mount 51, and the lower mount 52 are fixed to an upper surface of a lower Peltier device 20. The upper mounts 51, 52 are fixed to a lower surface of an upper Peltier device 20. These two Peltier devices 20 are held intimately against and fixed to respective upper and lower heat sinks 53.

The Nd:YVO$_4$ rod 15 is doped with 2 at % of Nd, and has a thickness of 1 mm. The optical wavelength converter 17 has a thickness of 5 mm along the optical axis of the laser-diode-pumped solid-state laser, and a cross-sectional area having a two-dimensional size of 1×1 mm perpendicular to the optical axis. The resonator mirror 16 has a central thickness of 4 mm and includes an inner curved surface 16a having a radius of curvature of 50 mm.

As with the first embodiment, the semiconductor laser 12 emits a pumping laser beam 11 having a wavelength λ1 of 809 nm, and is applied to the Nd:YVO$_4$ rod 15. When the neodymium atoms of the Nd:YVO$_4$ rod 15 are excited by the laser beam 11, the Nd:YVO$_4$ rod 15 emits a laser beam 25 having a wavelength λ2 of 1064 nm. The laser beam 25 then enters the optical wavelength converter 17, which converts the laser beam 25 into a second harmonic 26 having a wavelength λ3 of 532 nm.

The Nd:YVO$_4$ rod 15 has an entrance surface 15a coated with a coating layer for well reflecting the laser beam 25 and the second harmonic 26 with a reflectivity of 99.9% or higher and for well passing the pumping laser beam 11 therethrough with a transmittance of 99% or higher. The inner surface 16a of the resonator mirror 16 is coated with a coating layer for well reflecting the laser beam 25 and for well passing the second harmonic 26 therethrough. The optical wavelength converter 17 has opposite end surfaces 17a, 17b each coated with a coating layer for well passing the laser beam 25 therethrough.

The two Peltier devices 20 are driven by the driver circuit 22 in order to keep the temperature, as detected by a temperature sensor 21, in the resonator at a constant level. The temperature regulation in the resonator prevents the length of the resonator from varying due to temperature changes. Since the resonator is vertically sandwiched between the Peltier devices 20, any temperature gradient is unlikely to occur within the resonator, and hence the temperature in the resonator tends to remain constant regardless of changes in the ambient temperature.

According to the sixth embodiment, insofar as the ambient temperature is constant, the temperature in the resonator can be maintained at a constant level with a high temperature controlling accuracy of ±0.001° C. Furthermore, even when the ambient temperature varies from 20° C. to 40° C. at a rate of 300° C./h, any change in the temperature in the resonator is reduced to 0.01° C. or less. Inasmuch as the accuracy with which the temperature in the resonator is controlled is very high, the length of the resonator can be kept constant highly accurately, making it possible to reliably suppress any drifts of the output level of the second harmonic 26.

While the resonator is vertically sandwiched between the two Peltier devices 20 in the sixth embodiment, the laser-diode-pumped solid-state laser may have three or four Peltier devices surrounding the resonator on three or four sides thereof for much higher temperature controllability.

The present invention is applicable to not only the illustrated laser-diode-pumped solid-state laser for converting a solid-state-oscillated laser beam into a second harmonic, but also a laser-diode-pumped solid-state laser for producing a beam whose frequency is the sum of the frequency of a solid-state-oscillated fundamental laser beam and the frequency of another beam, and a laser-diode-pumped solid-state laser for producing a third harmonic from a solid-state-oscillated laser beam.

Although certain preferred embodiments of the present invention have been shown and described in detail, it should be understood that various changes and modifications may be made therein without departing from the scope of the appended claims.

What is claimed is:

1. A laser-diode-pumped solid-state laser comprising:
   (i) a semiconductor laser for emitting a pumping laser beam;
   (ii) a solid-state laser rod doped with a rare-earth element, for producing a laser beam in response to being pumped by said pumping laser beam;
   (iii) a resonator for oscillating the laser beam produced by said solid-state laser rod;
   (iv) wavelength converting means for converting the wavelength of the oscillated laser beam into another wavelength;
   (v) common temperature regulating means for regulating the temperature of both said semiconductor laser and said resonator;
   further including a heat sink and an etalon, said solid-state laser rod, said wavelength converting means, and said etalon being intimately held together and jointly serving as said resonator, said semiconductor laser and said resonator being mounted on said heat sink, said common temperature regulating means comprising a Peltier device and a driver circuit for controlling said Peltier device, said heat sink being mounted on said Peltier device.

2. A laser-diode-pumped solid-state laser according to claim 1, further including a heat sink, said solid-state laser rod and said wavelength converting means jointly serving as said resonator, said semiconductor laser and said resonator being mounted on said heat sink, said common temperature regulating means comprising a Peltier device and a driver circuit for controlling said Peltier device, said heat sink being mounted on said Peltier device.

3. A laser-diode-pumped solid-state laser according to claim 1, further including a heat sink, said solid-state laser rod and said wavelength converting means being intimately held together and jointly serving as said resonator, said semiconductor laser and said resonator being mounted on said heat sink.

4. A laser-diode-pumped solid-state laser according to any one of claims 1, 2, or 3, wherein said common temperature regulating means comprises at least one Peltier device and at least one driver circuit for controlling said Peltier device.

5. A laser-diode-pumped solid-state laser according to claim 4 wherein a plurality of Peltier devices constituting the common temperature regulating means are provided in such a way that they surround the semiconductor laser and the resonator.

6. A laser-diode-pumped solid-state laser comprising:
   (i) a semiconductor laser for emitting a pumping laser beam;
   (ii) a solid-state laser rod doped with a rare-earth element for producing a laser beam in response to being pumped by said pumping laser beam, oscillating the laser beam produced by said solid-state laser rod, and converting the wavelength of the oscillated laser beam into another wavelength;
   (iii) common temperature regulating means for regulating the temperature of both said semiconductor laser and said solid-state laser rod;
   wherein a plurality of Peltier devices constituting the common temperature regulating means are provided in such a way that they surround the semiconductor laser and the solid-state laser rod.

7. A laser-diode-pumped solid-state laser according to claim 6, further including a heat-sink, said solid-state laser rod being mounted on said heat sink.

8. A laser-diode-pumped solid-state laser according to claim 6 or 7, wherein said common temperature regulating means comprises at least one Peltier device and at least one driver circuit for controlling said Peltier device.

9. A laser-diode-pumped solid-state laser comprising:

(i) a semiconductor laser for emitting a pumping laser beam;
(ii) a solid-state laser rod doped with a rare-earth element, for producing a laser beam in response to being pumped by said pumping laser beam;
(iii) a resonator for oscillating the laser beam produced by said solid-state laser rod;
(iv) wavelength converting means for converting the wavelength of the oscillated laser beam into another wavelength; and
(v) common temperature regulating means for regulating the temperature of both said semiconductor laser and said resonator;
wherein a plurality of Peltier devices constituting the common temperature regulating means are provided in such a way that they surround the semiconductor laser and the resonator.

10. A laser according to claim 9, wherein said resonator is sandwiched between two Peltier devices, and a driver circuit controls said two Peltier devices.

* * * * *